March 2, 1948.  E. H. WRIGHT  2,437,061
PROJECTION OF STEREOSCOPIC IMAGES
Filed June 5, 1945
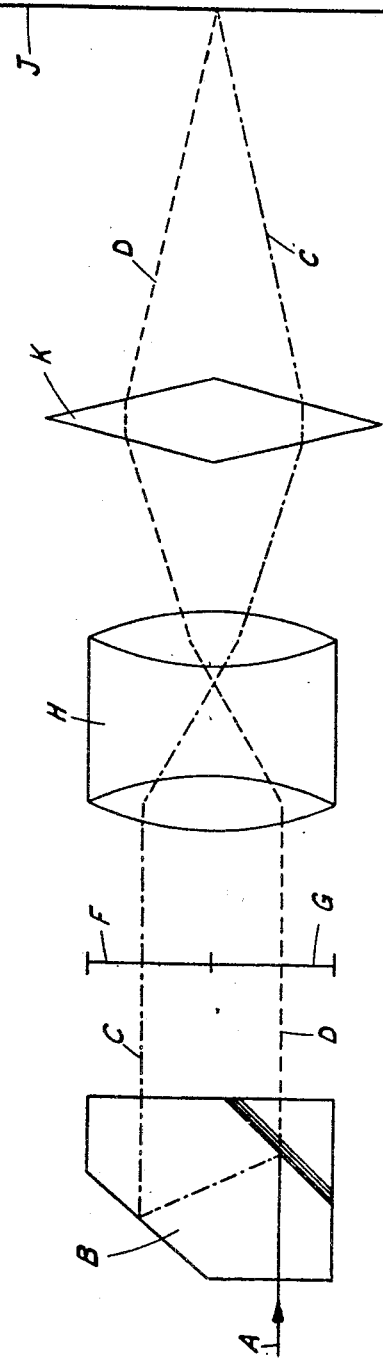
INVENTOR.
E. H. WRIGHT.
BY *Haseltine, Lake & Co.*
ATTORNEYS.

Patented Mar. 2, 1948

2,437,061

UNITED STATES PATENT OFFICE 2,437,061

PROJECTION OF STEREOSCOPIC IMAGES

Edwin Herbert Wright, Farnham Common, England

Application June 5, 1946, Serial No. 674,481
In Great Britain September 7, 1945

2 Claims. (Cl. 88—16.6)

This invention relates to systems for the projection of stereoscopic cinematograph images.

Various systems involving the use of polarised light have been suggested but those systems of which I am aware have either required the production of a special type of film, have necessitated some important alterations in the projector mechanism, or have involved an optical device which required to be coupled up with the projector mechanism. The principal object of the present invention is to provide a projection system which overcomes all these disadvantages and involves no more than the insertion of simple optical devices between the light source and the film gate and in front of the objective.

According to the invention, a system for the projection of stereoscopic cinematograph images consisting of left and right eye-view images arranged side-by-side on successive frames on a single width film, comprises means disposed between the light source and the film for dividing the light beam into two parallel beams polarised in planes mutually at right angles whereby the side-by-side left and right eye-view images are projected by the respectively polarised beams, and means for superimposing the thus projected images on the screen.

A suitable means for dividing the light beam into two parallel beams polarised in planes mutually at right angles is described in the specification of my co-pending application No. 584,281 with reference to Figure 2.

A simple bi-prism may conveniently be used for superimposing the pair of stereoscopic images on the screen.

The system can readily be converted in known manner to operate with circularly polarised light by the interposition of a quarter wave retardation plate at any suitable point in the light beam.

One embodiment of the invention will now be described by way of example with reference to the accompanying diagrammatic drawing which is partly in plan and partly in elevation.

The light beam A of the projector is caused to strike a polarising device B of the kind described in the specification of my co-pending application No. 584,281 with reference to Figure 2. Such a polarising device provides a polarised beam C and a parallel beam D polarised in a plane at right angles to the plane of the polarised beam C. The polarised beams C and D are utilised to project pairs of stereoscopic images arranged side-by-side on successive frames of a single-width film. Such a pair of images are indicated at F and G, it being understood that the polarising device B and the film are viewed in plan with the film passing through the plane of the paper. After passing through the usual objective H, the images are superimposed on the screen J by means of the simple bi-prism K, the objective H and bi-prism K being viewed in elevation.

In order that the images may be viewed stereoscopically it is merely necessary to provide analysers with planes of polarisation corresponding with those produced by the polariser B to ensure that the respective eye-view images are received only by the appropriate eye.

I claim:

1. A system for the projection by means of a single light beam of stereoscopic cinematograph images consisting of left and right eye-view images arranged side-by-side on successive frames on a single width film, comprising means disposed in said beam between the light source and the film for dividing said beam into two parallel and contiguous beams polarized in planes mutually at right angles, said polarized beams passing through the left and right eye-view images respectively, a single objective and means for superimposing the respective eye-view images on the screen.

2. A system according to claim 1, wherein the means for superimposing the images on the screen consists of a bi-prism.

EDWIN HERBERT WRIGHT.

REFERENCES CITED

The following references are of record in the file of this patent:

UNITED STATES PATENTS

| Number | Name | Date |
| --- | --- | --- |
| 1,503,766 | Pictet et al. | Aug. 5, 1924 |

FOREIGN PATENTS

| Number | Country | Date |
| --- | --- | --- |
| 224,393 | Great Britain | Nov. 13, 1924 |
| 519,488 | Great Britain | Mar. 28, 1940 |